US011898888B2

(12) United States Patent
Laun et al.

(10) Patent No.: US 11,898,888 B2
(45) Date of Patent: Feb. 13, 2024

(54) RADIOMETRIC MEASURING DEVICE FOR DETERMINING A MASS FLOW RATE

(71) Applicant: VEGA GRIESHABER KG, Wolfach (DE)

(72) Inventors: Robert Laun, Hausach (DE); Natalie Waldecker, Ortenberg (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/644,134

(22) Filed: Dec. 14, 2021

(65) Prior Publication Data

US 2022/0187109 A1 Jun. 16, 2022

(30) Foreign Application Priority Data

Dec. 15, 2020 (DE) ...................... 10 2020 133 594.6

(51) Int. Cl.
*G01F 1/00* (2022.01)
*G01F 25/10* (2022.01)
*B65G 43/00* (2006.01)

(52) U.S. Cl.
CPC .............. *G01F 1/00* (2013.01); *B65G 43/00* (2013.01); *G01F 25/10* (2022.01);
(Continued)

(58) Field of Classification Search
CPC ... G01F 1/00; G01F 25/10; G01F 1/86; B65G 43/00; B65G 2201/04; B65G 2203/0208;
(Continued)

(56) References Cited

U.S. PATENT DOCUMENTS 4,599,514 A 7/1986 Cho
6,493,418 B1 12/2002 Di
(Continued)

FOREIGN PATENT DOCUMENTS

CN 108051069 A 5/2018
DE 10 2007 051 135 A1 4/2009
(Continued)

OTHER PUBLICATIONS

Office Action dated Apr. 21, 2021 in corresponding Germany Patent Application No. 10 2020 133 594.6 (with English Translation), 6 pages.
(Continued)

*Primary Examiner* — Peter J Macchiarolo
*Assistant Examiner* — John M Royston
(74) *Attorney, Agent, or Firm* — Oblon, McClelland, Maier & Neustadt, L.L.P.

(57) ABSTRACT

A radiometric measuring device for determining a mass flow of a bulk material on a conveyor belt including, at least one detector which is configured to detect at least part of radiation of at least one radiation source the emits the radiation in a direction of the bulk material on the conveyor belt, the radiation having at least partially passed through the bulk material and the conveyor belt, at least one evaluation circuit which is configured to determine the mass flow of the bulk material based on the detected radiation; at least one storage means which is set up to store at least one measured value equation, the measured value equation mapping a relationship between the detected radiation and the mass flow, at least one electronic calculation means which is set up to determine, based on at least one calibration measurement without bulk material on the conveyor belt, a correction equation with which the measured value equation is corrected.

19 Claims, 2 Drawing Sheets

Figure 1:
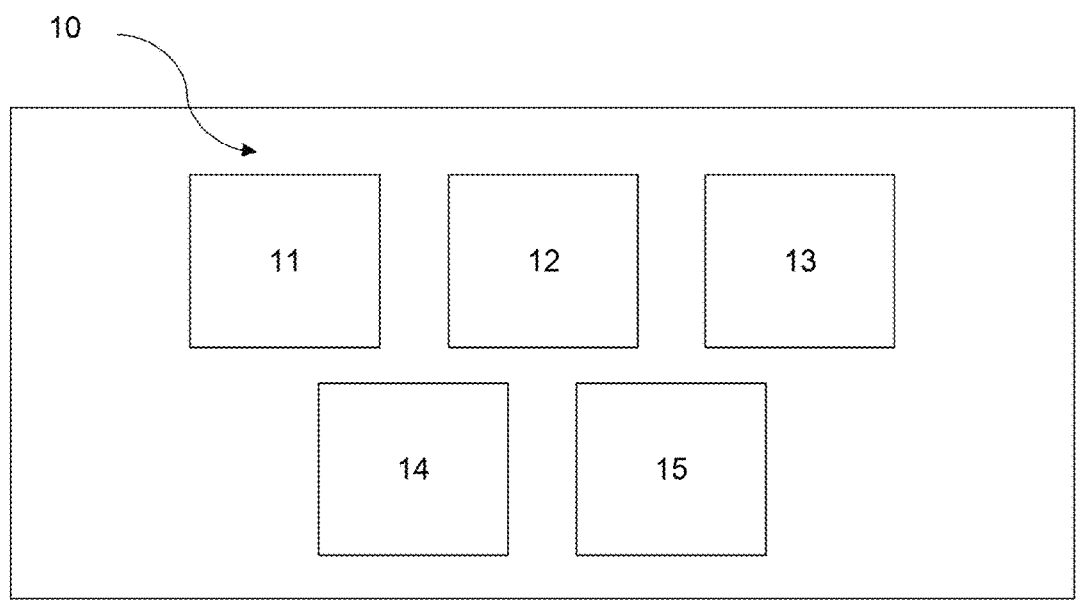

(52) U.S. Cl.
CPC .. *B65G 2201/04* (2013.01); *B65G 2203/0208* (2013.01); *B65G 2203/042* (2013.01)

(58) Field of Classification Search
CPC .. B65G 2203/042; B65G 43/08; G01G 9/005; G01G 11/00
See application file for complete search history.

(56) References Cited

U.S. PATENT DOCUMENTS

2015/0377690 A1* 12/2015 Phelan ................... G01F 25/10
73/1.34
2016/0258891 A1* 9/2016 Kullenberg ............ G01N 33/46

FOREIGN PATENT DOCUMENTS

EP         0 395 190 A1    10/1990
WO     WO 01/11324 A1    2/2001

OTHER PUBLICATIONS

United Kingdom Search Report dated May 24, 2022, in Great Britain Patent Application No. 2117277.0, 4 pages.

* cited by examiner

RADIOMETRIC MEASURING DEVICE FOR DETERMINING A MASS FLOW RATE

CROSS-REFERENCE TO RELATED APPLICATIONS

This application claims the benefit of the filing date of German Patent Application No. 10 2020 133 594.6 filed on 15 Dec. 2020, the entire content of which is incorporated herein by reference.

FIELD

The disclosure relates to a radiometric measuring device for determining a mass flow of a bulk material on a conveyor belt, a method for determining a mass flow of a bulk material on a conveyor belt, a system for determining a mass flow of a bulk material on a conveyor belt, a use of a detector unit and/or evaluation unit in such a measuring device, and a computer program Product.

BACKGROUND

Radiometric measuring devices are basically known in the prior art and can be used, for example, in the process industry to determine and monitor the mass flow of a bulk material on a conveyor belt. The measuring systems for determining the mass flow of bulk materials on conveyor belts are known as belt trolleys. The measurements are carried out without contact, whereby the bulk material includes, for example, coal, earth, wood, foodstuffs and semi-finished products (e.g., screws). The determination of the mass flow is of particular importance, since large deviations of the actually conveyed quantity occur with corresponding inaccuracy and correspondingly high mass flow. This in turn leads to an inaccurate database for the operation of the plant in which the conveyor belt is located. For this reason, the radiometric measuring devices for determining the mass flow of a bulk material for conveyor belts must first be adjusted or calibrated to the respective conveyor belt and/or bulk material. This process is extremely time-consuming, since it must map different operating conditions (e.g., empty belt, partially filled belt, fully filled belt) and furthermore must be carried out at the plant. Thus, the process is cost and time intensive. This procedure must always be carried out in the event of changes to the conveyor belt (e.g., belt replacement, wear, adhesions) which have an influence on the measurement process, as otherwise the quality of the determination of the mass flow can change significantly.

In this context, it has now been found that in practice the calibration of the measuring device for determining the bulk material on the conveyor belt influences the quality and productivity of the plant. There is therefore a need to provide an improved radiometric measuring device for determining the mass flow of a bulk material on a conveyor belt. It is therefore an object of the present disclosure to provide an improved radiometric measuring device, and in particular it is an object of the present disclosure to improve the laborious calibration process that is necessary when changes are made to the conveyor belt.

These and other objects, which will still be mentioned when reading the following description or which may be recognized by the person skilled in the art, are solved by the subject matter of the independent claims. The dependent claims further form central ideas of the present embodiments in a particularly advantageous manner.

SUMMARY

In accordance with a first aspect, there is provided a radiometric measuring device configured to determine a mass flow rate of a bulk material on a conveyor belt, comprising: at least one radiation source, which is configured to emit radiation in the direction of the bulk material on the conveyor belt; at least one detector unit, which is configured to detect at least part of the radiation that has at least partially traversed the bulk material and the conveyor belt; at least one evaluation unit, which is configured to determine the mass flow of the bulk material based on the detected radiation; at least one storage means which is configured to store at least one measured value equation, the measured value equation mapping the relationship between the detected radiation and the mass flow; at least one electronic calculation means which is configured to determine, based on at least one calibration measurement without bulk material on the conveyor belt, a correction equation with which the measured value equation is corrected.

The term mass flow is defined here as the time derivative of the mass. Alternatively, a volume flow can also be determined from the mass flow if the density of the bulk material is known. The volume flow is defined as the time derivative of the volume. The mass flow is used to calculate the quantity of bulk material conveyed per unit of time.

The term bulk material is to be understood broadly in the present context and includes all solids and solid-like substances. For example, the term bulk material includes raw materials (e.g., coal), foodstuffs (e.g., sugar) and semi-finished products from the mechanical engineering industry (e.g., screws). As used herein, the term radiometric measuring device is to be understood broadly and includes all measuring devices based on a radiometric measuring principle. In the radiometric measuring principle, an attenuation of a radiation intensity of a radiation, which occurs when the radiation passes through a material or bulk material to be measured, is detected and evaluated. This makes it possible, for example, to determine the volume or mass or density of a bulk material located on a conveyor belt. The term radiation source is to be understood broadly in the present and includes elements that are arranged to emit radiation. In particular, the term radiation source as used herein includes radioactive preparations, for example 137Cs and/or 60Co preparations. The term detection unit is to be understood broadly in the present and includes elements arranged to convert a radiation into electrical signals. The term conveyor belt is to be broadly understood in the present and includes all devices arranged to transport bulk materials by means of a moving surface. In particular, the term conveyor belt includes roller conveyor belts. The term evaluation unit is to be understood broadly in the present and includes all units which are set up to evaluate data. In particular, the term evaluation unit comprises a processor (e.g., CPU). The term storage means is to be understood broadly in the present context and includes all units that are configured to store data. In particular, the term storage means comprises a ROM memory. The term measured value equation is to be understood broadly and includes any equation that represents a relationship between a detected radiation and a mass flow. The measured value equation can, for example, be determined experimentally via a plurality of individual measurements on a conveyor belt and predetermined or defined masses of bulk material. The term calibration measurement is to be understood in the present context as meaning that a measurement is carried out on a conveyor belt without bulk material being located thereon. The term calibration measurement is to be distinguished from an initial calibration, which is carried out during the commissioning of a new conveyor belt system with a radiometric measuring device. In other words, the term calibration measurement as used herein means a reduced-effort post-calibration. As used herein, the term computing means, also referred to as calculating means, is to be understood broadly and includes means adapted to determine a correction equation. In particular, the term computing means as used herein includes a processor (e.g., a CPU). As used herein, the term correction equation is to be broadly understood and includes mathematical expressions that describe a change in the conveyor belt. The term correction equation includes functions, factors and offsets.

The disclosure is based on the knowledge that radiometric measuring devices for determining mass flows of bulk material on conveyor belts must be calibrated again when the conveyor belt geometry is changed. The change of the conveyor belt geometry can occur, for example, by changing a belt or by adhesions of the bulk material to an existing belt. Due to the change in conveyor belt geometry, the intensity of the detected radiation also changes. This inevitably leads, if this change is not taken into account, to a falsified result in the determination of the mass flow. A new measured value equation would now have to be created as part of a calibration. In the case of a complete calibration, a large number of calibration measurements would have to be carried out for different measuring points, each measuring point representing a different defined mass of the bulk material. The present embodiments allow the full calibration to be dispensed with. The present embodiments simply measure a single measurement point, at which there is no bulk material on the conveyor belt and calculates a correction equation therefrom. No second or further measurement is required, for example, when the conveyor belt is fully or partially loaded, i.e., at further calibration measurement points. It should be noted at this point that the one measurement point can, however, be measured any number of times for statistical validation. However, this is much less costly than with a partially filled and/or filled conveyor belt, since no specific mass of the bulk material has to be provided. The correction equation is applied to the detected radiation. The underlying measured value equation, which was elaborately determined during initial commissioning, for example, is retained. Thus, the present embodiments enable efficient maintenance/servicing of the radiometric measuring device as well as high-quality determination of the mass flow rate over the lifetime of the radiometric measuring device and/or the conveyor belt.

The measurement value equation is formed from at least two measurement points, wherein at the first measurement point there is no bulk material on the conveyor belt and at the second measurement point there is a known mass flow of bulk material on the conveyor belt. The measurement equation may also comprise a plurality of measurement points, wherein the plurality of measurement points has a positive effect on the accuracy of the determination of the mass flow. Interpolation is applied between the individual measurement points. The interpolation may comprise linear and non-linear methods.

The correction equation is based on a change between the at least one calibration measurement and a value of the measurement equation without bulk material. The change here means the change in the detected radiation for a conveyor belt on which there is no bulk material, one value originating from the measured value equation and the other value from the calibration measurement. The change can be described mathematically in any way. For example, the change can be described in absolute, relative, logarithmic, exponential or differential terms. The exact mathematical description enables an increase in the accuracy of the determination of the mass flow.

The correction equation is based on a quotient from the at least one calibration measurement and a value of the measured value equation without bulk material. The quotient comprises the detected radiation at conveyor belt without bulk material from the calibration measurement and the measured value equation.

The correction equation is based on a difference between the at least one calibration measurement and a value of the measured value equation without bulk material. The difference can be formed absolutely or relatively.

The at least one electronic calculation means is set up to determine, based on the at least one calibration measurement without bulk material on the conveyor belt, a correction factor by which the measured value equation or the determined mass flow is multiplied. The correction factor is formed from the quotient between the calibration measurement and measured value equation with the conveyor belt without bulk material. The correction factor is multiplied by the detected radiation, whereby the product of detected radiation and correction factor acts as input variable for the measured value equation and the mass flow is determined therefrom with the measured value equation.

According to another aspect, there is provided a method for determining a mass flow rate of a bulk material on a conveyor belt, comprising: Emitting radiation toward the bulk material on the conveyor belt; Detecting at least a portion of the radiation; that has at least partially traversed the bulk material and the conveyor belt; Determining the mass flow of the bulk material based on the detected radiation; Storing at least one measurement equation, wherein the measurement equation represents the relationship between the detected radiation and the mass flow; Determining a correction equation based on at least one calibration measurement without bulk material on the conveyor belt, with which the measurement equation is corrected.

In the method, the correction equation is based on a change between the at least one calibration measurement and a value of the measurement equation without bulk material.

In the method, the correction equation is based on a quotient of the at least one calibration measurement and a value of the measurement equation without bulk material.

In the method, the correction equation is based on a difference between the at least one calibration measurement and a value of the measurement equation without bulk material.

In the method, the calibration measurement is performed after a belt of the conveyor is changed and/or after predetermined time intervals. When the conveyor belt is changed, the wall thickness of the belt may change and thus the attenuation of the belt with respect to the radiation, which may lead to a distortion of the mass flow. Performing the procedure at specific time intervals allows for sustained maintenance with increased efficiency. This further ensures increased accuracy in determining the mass flow.

The method further comprises comparing the calibration measurement to a threshold value and determining a condition for the conveyor belt based on the comparison. The limit value corresponds to a detected radiation that indicates an unacceptable change in the conveyor belt (e.g., excessive adhesion). When below the threshold value, the condition is determined to be, for example, NOK (out of order), and above the threshold value, the condition is determined to be 10 (in order). Based on the determined condition, a maintenance measure, for example an inspection, can be initiated.

According to another aspect, there is provided a system for determining a mass flow rate of a bulk material on a conveyor belt, comprising: conveyor belt adapted to convey bulk material; at least one measuring device described in more detail above.

Another aspect relates to the use of a detector unit and/or an evaluation unit in a measuring device described in more detail above.

A further aspect relates to a computer program product which, when executed on a processor, is arranged to perform the steps of a method described in more detail above and/or to control a measuring device and/or system described in more detail above.

DETAILED DESCRIPTION OF THE EMBODIMENTS

In the following a detailed description of the figures is given, in which shows

Figure 2:
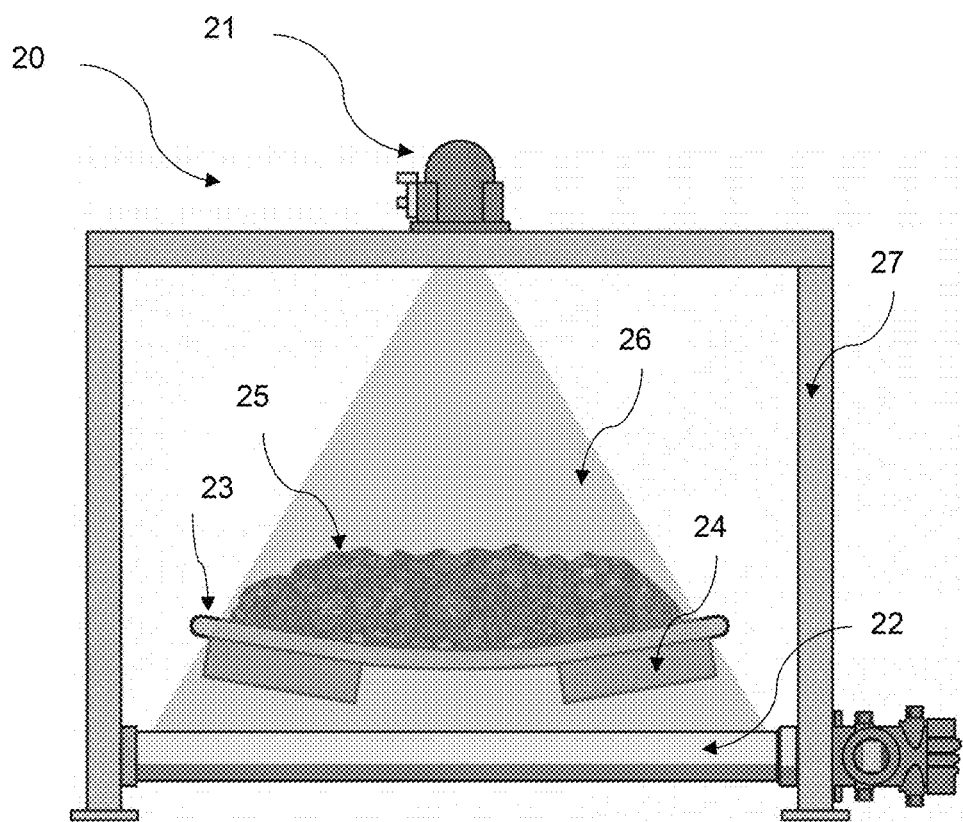
Figure 3:
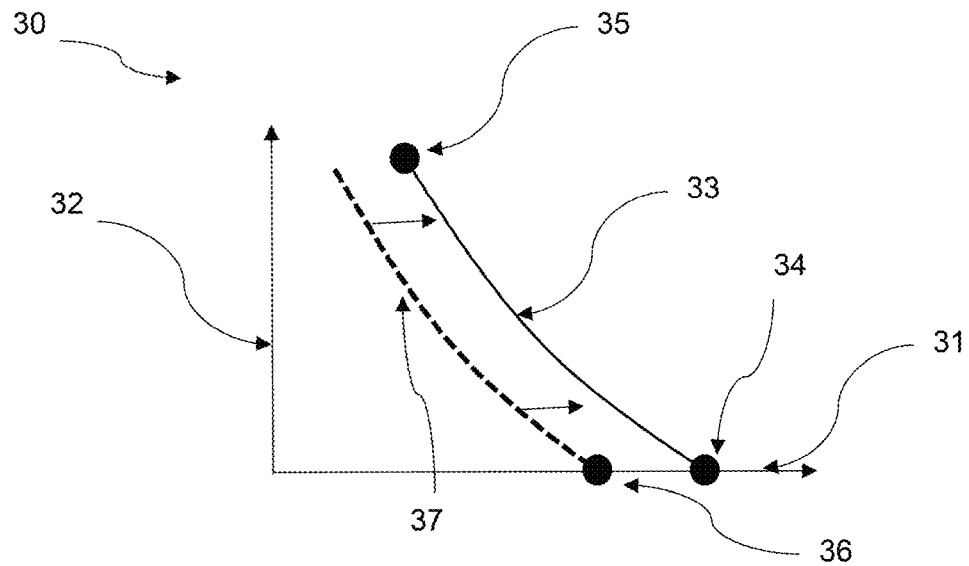

FIG. 1 a schematic view of a radiometric measuring device of a first embodiment;

FIG. 2 schematic view of a system of an embodiment;

FIG. 3 a diagram for a measured value equation; and

Figure 4:
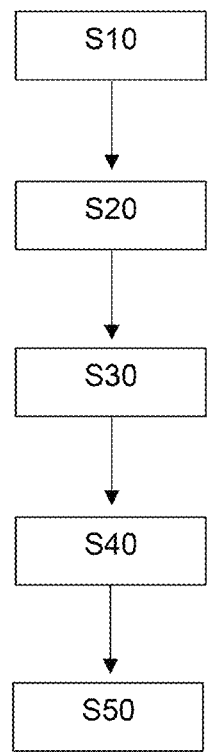

FIG. 4 a flow chart of a process of an embodiment.

FIG. 1 shows a schematic view of a radiometric measuring device of a first embodiment. The radiometric measuring device 10 is used for determining a mass flow of a bulk material on a conveyor belt. The radiometric measuring device comprises a radiation source 11 arranged to emit radiation in the direction of the bulk material on the conveyor belt. The radiation source is a radioactive preparation, for example a $^{137}$Cs and/or $^{60}$Co preparation. Further, the radiometric measurement device 10 comprises a detector unit 12 arranged to detect at least a portion of the radiation that has at least partially traversed the bulk material and the conveyor belt. The detector unit 12 is arranged to convert a radiation into electrical signals. For example, the detector unit 12 comprises a scintillation tube. Furthermore, the radiometric measuring device 10 comprises an evaluation unit 13 which is arranged to determine the mass flow of the bulk material based on the detected radiation. In the present case, the evaluation unit 13 is a microcontroller. Furthermore, the radiometric measuring device comprises a storage means 14, which is arranged to store at least one measured value equation, the measured value equation representing the relationship between the detected radiation and the mass flow. In the present example, the storage means is a ROM memory of the microcontroller. Furthermore, the radiometric measuring device 10 comprises an electronic calculation means 15 which is arranged to determine, based on at least one calibration measurement without bulk material on the conveyor belt, a correction equation with which the measured value equation is corrected. In the present case, the computing means 15 is also represented by the microcontroller. In this context, it should be noted that the units or means can be executed separately or integrally, such as by a microcontroller.

FIG. 2 shows a schematic view of a system 20 of an embodiment. The system 20 comprises a measuring device and a conveyor belt 23, the radiation source 21 being mounted on a gantry 27 above the bulk material 25. The radiation source 21 emits radiation onto the bulk material in the form of a radiation cone 26. The radiation passes through the bulk material 25, the conveyor belt 23 including conveyor rollers 24 and impinges on the detector unit 22 of the measuring device.

FIG. 3 shows a diagram 30 for a measured value equation. On the horizontal axis 31 of the diagram 30 the detected radiation is plotted. On the vertical axis 32 of the diagram 30 the mass flow of the bulk material is plotted. The course 33 shows the graphical representation of the measured value equation from the initial calibration, which has been determined from two measuring points 34, 35, whereby the measuring point 34 has been determined with an empty conveyor belt, i.e., without bulk material. Point 36 corresponds to a calibration measurement that was carried out after commissioning with an empty conveyor belt, for example when a belt change took place. There is a change in the recorded radiation between the measuring points 34 and 36. The course 37 shows the graphical representation of a theoretically imagined new measured value equation, as it could run in the case of a new complete calibration (i.e., comprising a large number of individual measuring points) after the belt change. By multiplying the new measured values after the calibration measurement by the correction factor, the course of the theoretically imagined new measured value equation 37 can be shifted back or mapped to the course 33 of the measured value equation of the initial calibration. Thus, it is possible to avoid or reduce the renewed calibration effort and to continue to obtain a high accuracy in the determination of the mass flow.

FIG. 4 shows a flow diagram of a method of an embodiment. In a first step S10, radiation is emitted in the direction of the bulk material on the conveyor belt. In a step S20, at least part of the radiation is detected that has at least partially traversed the bulk material and the conveyor belt. In a step S30, the mass flow rate of the bulk material is determined based on the detected radiation. In a step S40, at least one measurement equation is stored, the measurement equation representing the relationship between the detected radiation and the mass flow. In a step S50, a correction equation is determined based on at least one calibration measurement without bulk material on the conveyor belt, with which the measured value equation is corrected. In this case, the correction equation comprises, for example, a correction factor which is formed from a quotient of the detected radiation of the calibration measurement and measured value equation for a respective conveyor belt without bulk material. The correction factor is then multiplied by the detected radiation, for example, and the resulting product is applied as an input variable for the measured value equation from the original calibration in order to determine the mass flow.

LIST OF REFERENCE SIGNS

10 Radiometric measuring device
11, 21 Radiation source
12, 22 Detector unit
13 Evaluation unit
14 Storage medium
15 electronic calculator
20 System
23 Conveyor belt
24 Conveyor rollers
25 Bulk material 26 Radiation cone
27 Portal
30 Diagram of measured value equation
31 horizontal axis measured radiation
32 Vertical axis Mass flow
33 Course of measured value equation initial calibration
34 First measuring point
35 Second measuring point
36 Measured value Calibration measurement
37 Course of theoretically imagined new measurement equation

The invention claimed is:

1. A radiometric measuring device for determining a mass flow rate of a bulk material on a conveyor belt, comprising:
at least one detector configured to detect at least part of radiation of at least one radiation source that emits the radiation in a direction of the bulk material on the conveyor belt, the radiation having at least partially passed through the bulk material and the conveyor belt;
at least one evaluation circuit configured to determine a mass flow of the bulk material on a basis of the detected radiation;
at least one storage which is configured to store at least one measured value equation, the measured value equation representing a relationship between the detected radiation and the mass flow; and
at least one electronic calculation means which is configured to determine, based on at least one calibration measurement without bulk material on the conveyor belt, a correction equation with which the measured value equation is corrected,
wherein the calibration measurement is performed after a belt of the conveyor belt is changed.

2. The radiometric measuring device according to claim 1, wherein the measured value equation is formed from at least a first and a second measuring point, wherein at the first measuring point no bulk material is located on the conveyor belt and at the second measuring point a known mass flow of bulk material is located on the conveyor belt.

3. The radiometric measuring device according to claim 1, wherein the correction equation is based on a change between the at least one calibration measurement and a value of the measurement equation without bulk material.

4. The radiometric measuring device according to claim 1, wherein the correction equation is based on a quotient of the at least one calibration measurement and a value of the measurement equation without bulk material.

5. The radiometric measuring device according to claim 1, wherein the correction equation is based on a difference between the at least one calibration measurement and a value of the measurement equation without bulk material.

6. The radiometric measuring device according to claim 1, wherein the at least one electronic calculation means is configured to determine, based on the at least one calibration measurement without bulk material on the conveyor belt (23), a correction factor by which the measured value equation or the determined mass flow is multiplied.

7. The radiometric measuring device according to claim 2, wherein the correction equation is based on a change between the at least one calibration measurement and a value of the measurement equation without bulk material.

8. The radiometric measuring device according to claim 3, wherein the correction equation is based on a change between the at least one calibration measurement and a value of the measurement equation without bulk material.

9. A method of determining a mass flow rate of a bulk material on a conveyor belt, comprising:

detecting at least a portion of radiation emitted towards the bulk material on the conveyor belt, the radiation having at least partially traversed the bulk material and the conveyor belt;
determining the mass flow rate of the bulk material based on the detected radiation;
storing at least one measured value equation, the measured value equation representing a relationship between the detected radiation and a mass flow; and
determining a correction equation based on at least one calibration measurement without bulk material on the conveyor belt, with which the measured value equation is corrected,
wherein the calibration measurement is performed after a belt of the conveyor belt is changed.

10. The method of claim 9, wherein the correction equation is based on a change between the at least one calibration measurement and a value of the measurement equation without bulk material.

11. The method of claim 9, wherein the correction equation is based on a quotient of the at least one calibration measurement and a value of the measurement equation without bulk material.

12. The method of claim 9, wherein the correction equation is based on a difference between the at least one calibration measurement and a value of the measurement equation without bulk material.

13. The method of claim 9, further comprising comparing the calibration measurement to a threshold value and determining a condition for the conveyor belt based on the comparison.

14. The method of claim 10, wherein the correction equation is based on a quotient of the at least one calibration measurement and a value of the measurement equation without bulk material.

15. The method of claim 10, wherein the correction equation is based on a difference between the at least one calibration measurement and a value of the measurement equation without bulk material.

16. The method according to claim 10, wherein the calibration measurement is performed after a belt of the conveyor belt is changed and/or after predetermined time intervals.

17. The method of claim 10, further comprising comparing the calibration measurement to a threshold value and determining a condition for the conveyor belt based on the comparison.

18. A system for determining a mass flow rate of a bulk material on a conveyor belt, comprising:
a conveyor belt;
a measuring device for determining a mass flow rate of a bulk material on a conveyor belt, including:
at least one detector configured to detect at least part of radiation of at least one radiation source that emits the radiation in a direction of the bulk material on the conveyor belt, the radiation having at least partially passed through the bulk material and the conveyor belt;
at least one evaluation circuit which is configured to determine the mass flow of the bulk material on the basis of the detected radiation;
at least one storage means which is configured to store at least one measured value equation, the measured value equation representing the relationship between the detected radiation and the mass flow; and
at least one electronic calculation means which is configured to determine, based on at least one calibration measurement without bulk material on the conveyor belt, a correction equation with which the measured value equation is corrected, wherein the calibration measurement is performed after a belt of the conveyor belt is changed.

19. A non-transitory computer readable medium having stored thereon a program that when executed by a computer causes the computer to implement a method of determining a mass flow rate of a bulk material on a conveyor belt, comprising:

detecting at least a portion of radiation emitted towards the bulk material on the conveyor belt, the radiation having at least partially traversed the bulk material and the conveyor belt;

determining the mass flow rate of the bulk material based on the detected radiation;

storing at least one measured value equation, the measured value equation representing a relationship between the detected radiation and a mass flow; and determining a correction equation based on at least one calibration measurement without bulk material on the conveyor belt, with which the measured value equation is corrected, wherein the calibration measurement is performed after a belt of the conveyor belt is changed.

* * * * *